Aug. 11, 1931.    J. M. G. FULLMAN ET AL    1,818,389
WALL BOX BASE FOR CONDUIT SYSTEMS
Filed May 18, 1929    2 Sheets-Sheet 2
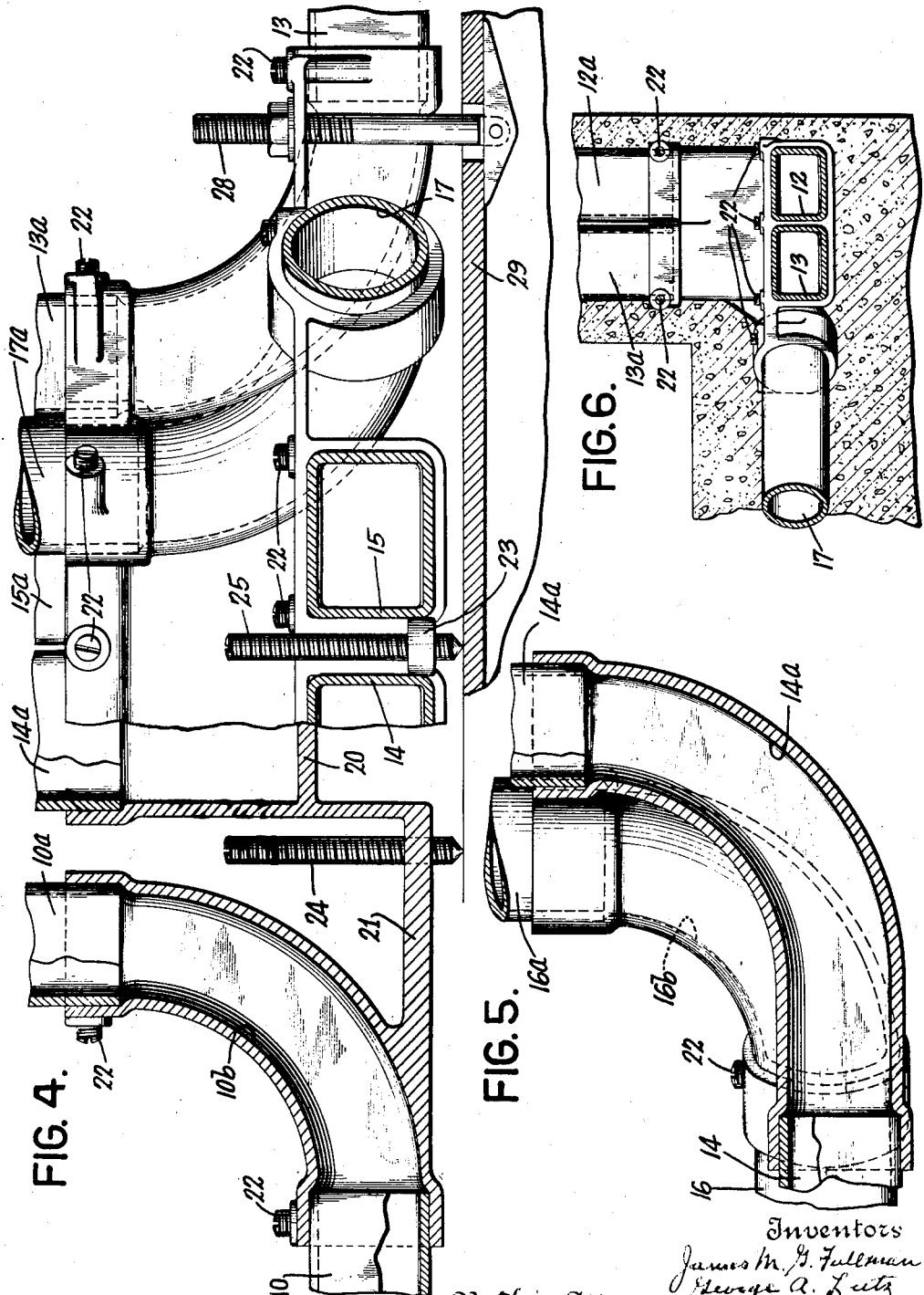
Inventors
James M. G. Fullman
George A. Lutz
By their Attorneys
Cooper, Kerr & Dunham Patented Aug. 11, 1931

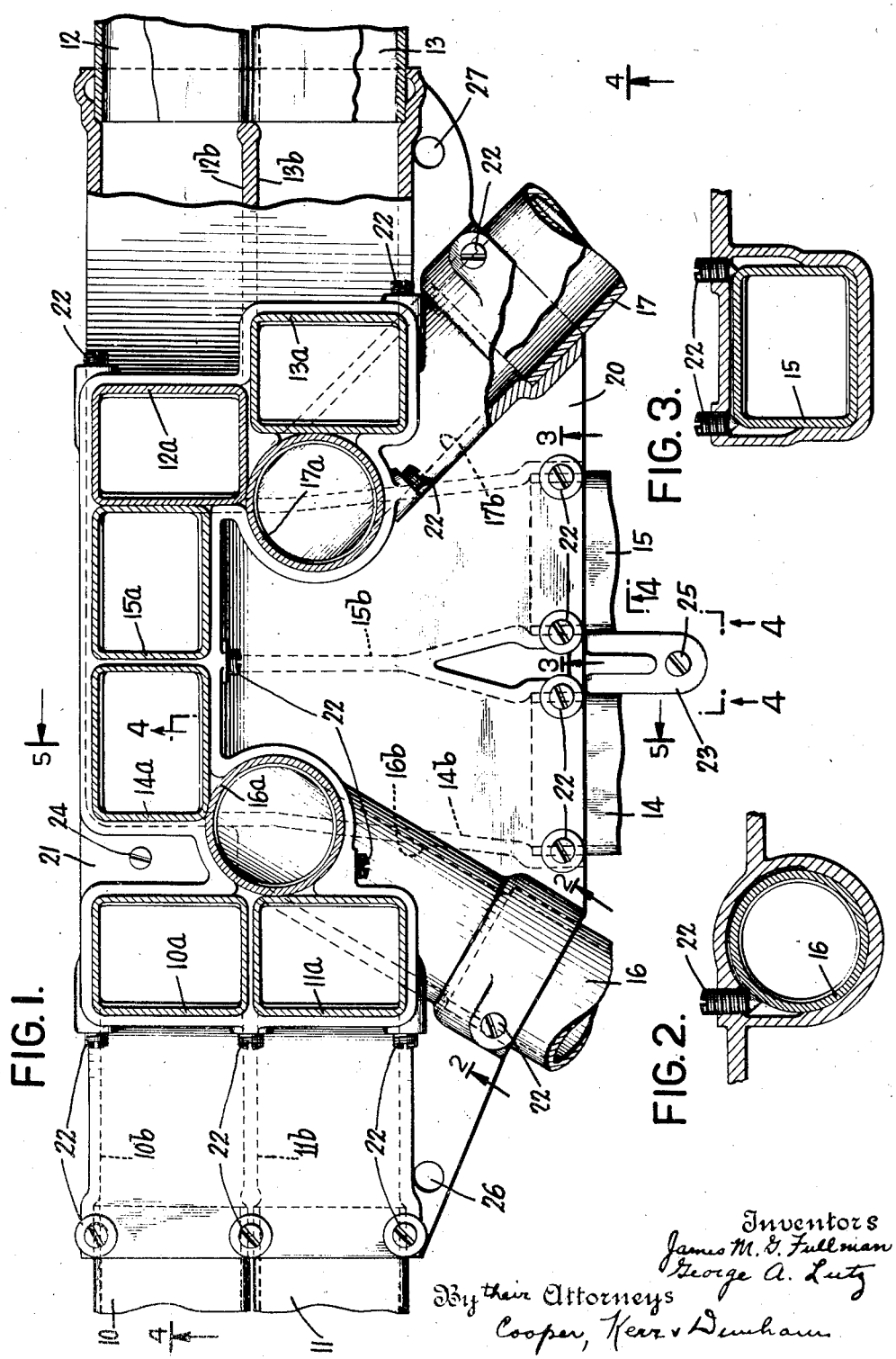

1,818,389

UNITED STATES PATENT OFFICE

JAMES M. G. FULLMAN, OF SEWICKLEY, PENNSYLVANIA, AND GEORGE A. LUTZ, OF PLAINFIELD, NEW JERSEY, ASSIGNORS TO NATIONAL ELECTRIC PRODUCTS CORPORATION, OF NEW YORK, N. Y., A CORPORATION OF DELAWARE

WALL BOX BASE FOR CONDUIT SYSTEMS

Application filed May 18, 1929. Serial No. 364,114.

This invention relates to improvements in connection boxes for conduit systems for electrical distribution. With such systems frequently horizontal runs of conduit extend to a point to which other conduit extensions have to be made in a vertical direction. For example, underfloor conduits or ducts may extend to a wall and at such wall vertical conduits are provided to extend to a wall box. Such vertical conduits must be connected with the underfloor conduits or ducts. Heretofore, such connections have been made by independent fittings and the use of such independent fittings requires extra labor in lining up and applying each fitting to a horizontal and vertical duct. Furthermore, independent fittings require extra space to enable them to be properly applied and adjusted.

The present invention has for one of its objects the provision of a wall box base which comprises a unitary structure adapted to receive a plurality of horizontally extending sections of conduit and having means to connect such sections individually with vertical conduit sections.

A further object of the present invention resides in the provision of a wall box base of such character that compactness is secured and in particular providing a construction in which a desired closely spaced arrangement of cooperating vertical conduits may be secured.

A further object of the present invention resides in the provision of a wall box base with improved means for leveling up and vertically adjusting the height of said box to facilitate the making of conduit connections thereto.

Other objects and advantages will be hereinafter set forth in the accompanying specification and claims and shown in the drawings which by way of illustration show a preferred embodiment of the invention.

In the drawings:

Figure 1 is a top plan view of the wall box base with certain parts shown in section to show the interior construction;

Figure 2 is a sectional view taken on line 2—2 of Figure 1;

Fig. 3 is a sectional view taken on line 3—3 of Fig. 1;

Fig. 4 is a transverse part sectional view taken substantially on lines 4—4, 4—4, 4—4 of Fig. 1 and looking in the direction of the arrow;

Fig. 5 is a sectional view taken substantially on line 5—5 of Fig. 1;

Fig. 6 is a fragmentary end view taken from the right of Fig. 1 and looking to the left and showing the wall box base and certain conduits embedded in concrete.

In more detail in the drawings, 10 and 11 are a pair of horizontally extended substantially rectangular conduits which extend to the left from the wall box base, which conduits are to be connected with vertically extending conduits $10a$ and $11a$ respectively. 12 and 13 are similar horizontally disposed rectangularly shaped conduits which approach the wall box base from the right, and such conduits are intended to be connected to cooperating vertically extending conduits $12a$ and $13a$. 14 and 15 are horizontally extending rectangularly shaped conduits which enter the wall box base from the front as shown in Fig. 1, and such conduits extend in a direction which is substantially perpendicular or at right angles to the direction of run of conduits 10, 11, 12 and 13. Such conduits 14 and 15 are intended to be connected to vertically extending conduits $14a$ and $15a$. 16 and 17 are tubular conduits having a round configuration which are horizontally disposed and which have an angular disposition with respect to the rectangular conduits heretofore mentioned. Such conduits are intended for connection to vertically extending conduits $16a$ and $17a$.

The wall box base connection fitting, preferably comprises a casting structure generally designated 20. This casting structure is hollowed out as much as possible for the sake of lightness and comprises a base plate portion 21. This casting also includes a number of elbow ducts or passages $10b$, $11b$, $12b$, $13b$, $14b$, $15b$, $16b$ and $17b$. Such duct passages respectively connect the various and correspondingly numbered horizontal conduits with the vertical conduits and are arranged with free sweeping curves to facilitate the drawing of the conductors therethrough from the horizontal duct runs to the vertical duct runs or vice versa.

The metal of the structure 20 is so cast that an integral structure is provided to define all of these various elbow shaped passages and the material is so disposed and the passages are so arranged that the various vertical cooperating conduits may be disposed closely adjacent each other as shown in Fig. 1. At the end of each elbow shaped passage the material of the base casting is shaped to provide female couplings to receive both the vertical extending conduits and the horizontally extending conduits. Preferably, connection to the rectangular conduits is afforded by providing set screws such as 22, which set screws have conical inner ends which are adapted to bear upon the curved corners of the cooperating rectangular ducts. Similar set screws are used on each of the various female couplings both at the top and bottom so that the cooperating ducts can be firmly clamped in position to the wall box base by tightening up the set screws. For the tubular conduits, one set screw 22 may be provided as shown in Fig. 2, or double set screws may be used as provided upon the rectangular conduits.

In order to provide for the compact spacing of vertical conduits 14a, 15a, one set screw 22 may be provided, the conical end of which is adapted to cooperate with the curved corners of both conduits 14a and 15a. Likewise in order to provide for the compact spacing of conduits 12a and 13a with respect to each other, each of these conduits is clamped in the female coupling by a single set screw 22. Similarly with conduits 10a and 11a where more space is available three set screws 22 are provided, the middle set screw cooperating with both conduits (see Fig. 1) and the outer set screws respectively cooperating with individual conduits.

Where an integral wall box base construction of this type is used, the structure is comparatively heavy and suitable provision should be made for leveling up the structure and adjusting it to a proper height about the sub-floor so that it will preferably line up with the conduits which are to be connected to it. For this purpose the following construction is provided. Threaded respectively into the base 21 and into an extension 23 from such base are threaded and screw slotted studs 24 and 25. These studs can be adjusted up or down to any desired height and in this way the proper vertical location and disposition of the wall box base assembly can be secured. To retain the assembly in this position and to aid in the adjustment, the assembly is provided with drilled openings 26 and 27 adjacent its ends. These drilled openings are adapted to receive toggle studs such as 28. These toggle studs may be passed through openings in the underfloor 29 and then adjusted to keep the assembly in a desired adjusted position. Any desired well known form of toggle stud can be used for this purpose.

It will be understood that the box assembly can tilt or rock on studs 24 and 25 and by means of the toggle stud which passes through 26 or 27 or both, the assembly can be adjusted for proper level.

As shown in Fig. 1, the vertical conduits 10a and 11a and the cooperating female couplings are closely spaced side by side. Conduits 14a and 15a and their cooperating female couplings are also closely spaced side by side. With conduits 12a and 13a there is a close end spacing but such conduits and their couplings are staggered somewhat to provide a space for conduit 17a and its cooperating coupling. This arrangement of an integral casting with all duct passages and the upper and lower female couplings all formed integrally in one casting provides for the desired closeness of spacing of the vertically disposed ducts which has heretofore not been obtainable with independent elbow fittings and also provides for the connection to horizontal duct runs which extend in various directions from the base. Each vertical conduit can be connected with its corresponding lower horizontal conduit through a passage having a sweeping curved configuration and such passages are distinct and separate from adjacent passages, being separated by the material of the casting.

While the invention has particular utility in wall box bases, it is not limited to such uses but may be employed anywhere where close grouping of conduits is desired and the term "wall box base" is to be considered as broadly covering such applications anywhere and not as being limited to an installation which is solely in a wall.

What we claim is:

1. A wall box base for connecting a plurality of vertical conduit runs with a plurality of runs of horizontally disposed conduits and for providing a separate and distinct passage connection between each vertical conduit and each cooperating horizontal conduit, said base comprising an integral casting with a plurality of distinctively separate curved passages formed integrally therein into which both the vertical and horizontal runs of conduit may be connected.

2. A wall box base for connecting a plurality of vertically disposed conduits individually and separately with a plurality of horizontally disposed conduits, said base comprising an integral one piece casting structure with distinctively separate elbow shaped ducts or passages disposed therein with the walls thereof formed integrally with said casting and affording individual passages for the drawing of the conductors from each of one set of conduits to each of the other, said elbow shaped passages being so relatively disposed to one another as to provide for a compact spacing of the vertically disposed conduits.

3. A wall box base for connecting a plurality of vertically disposed conduits each individually and separately with each of a plurality of horizontally disposed conduits, said base comprising an integral one piece casting structure with individual and distinctively separate elbow shaped passages therein having wall portions formed integrally with said one piece casting structure, said casting structure at the end of each passage being shaped to form female couplings for receiving the respective cooperating vertical and horizontally disposed conduits.

4. The invention set forth in claim 3 in which set screw means are provided in the casting in said coupling portions cooperating with curved portions of the inserted conduits and in which one set screw cooperates with a plurality of conduits disposed side by side whereby compactness of spacing of said conduits is afforded.

5. The invention set forth in claim 3 in which set screw means are provided in the coupling portions of said casting cooperating with remote curved portions of the conduits whereby a close spacing of the cooperating conduits is afforded with a staggered disposition of said conduits.

6. A wall box base for a conduit system for individually connecting a plurality of horizontal sections of conduit with a plurality of vertically disposed sections of conduit, said wall box base comprising a casting with a pair of adjustable studs carried thereby to permit adjustably supporting said casting, openings in said casting spaced apart from said supporting studs, and adjustable toggle bolt fastening means cooperating with said openings for the purpose of adjusting the box base for elevation and for level by co-acting with the adjustable supporting studs.

7. A wall box base comprising an integral casting shaped at the top to provide a plurality of female couplings for the reception of a plurality of vertically disposed ducts, said casting being also shaped adjacent the bottom thereof with other female coupling portions for the reception of a plurality of conduits which extend out in various directions from said base and a plurality of individual passages each being distinctively separate from the other passages and each formed integrally in said casting and having a sweeping curved configuration to afford ducts individually connecting the female couplings at the top with the related female couplings at the bottom.

8. A wall box base for connecting horizontally disposed conduits individually and separately with vertically extending conduits, said wall box base comprising an integral casting structure with integral wall portions therein defining a plurality of elbow shaped passages, each passage being separate and distinct from other passages and all of said passages extending at their upper ends in a vertical direction, and the elbow shaped portions of said casting walls providing for a horizontal disposition of the lower ends of the passages with certain passages extending in one direction, others in substantially the opposite direction and still others in a direction at angles to the aforesaid passages which extend in relatively opposite directions to each other.

9. The invention set forth in claim 8 in which the wall portions which define certain of the vertical passages are disposed in an inter-staggered relation to secure compactness of spacing of the vertical passages.

10. A wall box base comprising an integral casting shaped at the top to provide for the connection thereto of vertical disposed ducts, said casting being shaped at the bottom to provide for the connection thereto of a plurality of conduits which extend horizontally in at least three different directions, said casting having intermediate wall portions between the top and bottom thereof defining elbow shaped passages, each of which individually connects a bottom horizontally disposed conduit with only one of the vertically extending conduits.

11. A wall box base comprising a base plate, and portions integral with said base plate and defining a plurality of separate passages each of which is distinct and separate from the other passages, said portions being shaped to provide an elbow shape for each passage terminating in a vertical direction at the upper end of each passage and in a horizontal direction at the lower end of each passage.

12. A wall box base for connecting individually each of a plurality of vertically disposed conduits individually and separately with each of a plurality of horizontally disposed conduits, said wall box base including an integral casting structure with integral portions thereof defining distinctively separate elbow shaped passages.

In testimony whereof we hereto affix our signatures.

JAMES M. G. FULLMAN.
GEORGE A. LUTZ.